(12) United States Patent
Nishimura et al.

(10) Patent No.: US 6,497,303 B1
(45) Date of Patent: Dec. 24, 2002

(54) ELECTRIC POWER STEERING SYSTEM

(75) Inventors: Hiroshi Nishimura; Shigeki Ohtagaki; Kazuo Kikuta, all of Tokyo; Yuji Takatsuka, Kobe, all of (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/688,861

(22) Filed: Oct. 17, 2000

(30) Foreign Application Priority Data

Jun. 29, 2000 (JP) ...................................... 2000-196385

(51) Int. Cl.$^7$ ................................................. B62D 5/99
(52) U.S. Cl. ...................................... 180/446; 180/443
(58) Field of Search ........................... 180/443, 446; 701/41–43

(56) References Cited

U.S. PATENT DOCUMENTS

| | | | | |
|---|---|---|---|---|
| 5,652,487 A | * | 7/1997 | Nishino et al. | ............. 318/434 |
| 5,752,209 A | * | 5/1998 | Nishimoto et al. | ........... 701/41 |
| 5,889,376 A | * | 3/1999 | Takatsuka et al. | ........... 318/434 |
| 6,032,756 A | * | 3/2000 | Nishimura et al. | ......... 180/446 |
| 6,152,255 A | * | 11/2000 | Noro et al. | ................. 180/446 |
| 6,170,600 B1 | * | 1/2001 | Shimizu | .................... 180/446 |
| 6,213,249 B1 | * | 4/2001 | Noro et al. | ................. 180/446 |
| 6,223,852 B1 | * | 5/2001 | Mukai et al. | ................ 180/446 |
| 6,226,580 B1 | * | 5/2001 | Noro et al. | .................... 701/42 |
| 6,240,349 B1 | * | 5/2001 | Nishimoto et al. | ........... 701/41 |

FOREIGN PATENT DOCUMENTS

| | | |
|---|---|---|
| JP | 62-231871 | 10/1987 |
| JP | 2715473 | 11/1997 |

* cited by examiner

*Primary Examiner*—Paul N. Dickson
*Assistant Examiner*—L. Lum
(74) *Attorney, Agent, or Firm*—Sughrue Mion, PLLC (57) ABSTRACT

An electric power steering system is proposed in which it is possible to inspect function of switches connected to a motor.

An electric power steering system having a CPU 2 for calculating a control amount for controlling a motor 3 corresponding to a steering torque 1 and a driving circuit 8 for driving the motor 3, comprises a first switch 12 connected in series with the motor 3, a voltage monitoring circuit 10 for monitoring motor voltage, and a drive restricting circuit 11 for restricting operation of the driving circuit 8 besides the CPU 2, and in which the CPU 2 inspects function of the first switch 12 from drive of the driving circuit 8 and results detected by the voltage monitoring circuit 10 when it is judged that the driving circuit 8 is not restricted from a situation of the steering torque 1 or the drive inhibiting circuit 11.

10 Claims, 11 Drawing Sheets

| NO | Tr4 | Tr5 | Tr6 | Tr7 | RELAY | E1 | E2 |
|---|---|---|---|---|---|---|---|
| 1 | OFF | OFF | OFF | OFF | NORMAL | H | H |
| 2 | OFF | OFF | OFF | OFF | WELDED | H | H |
| ③ | ON | OFF | OFF | OFF | NORMAL | L | H |
| ④ | ON | OFF | OFF | OFF | WELDED | L | L |
| 5 | ON | OFF | OFF | ON | NORMAL | L | H |
| 6 | ON | OFF | OFF | ON | WELDED | L | H |
| ⑦ | OFF | ON | OFF | OFF | NORMAL | H | L |
| ⑧ | OFF | ON | OFF | OFF | WELDED | L | L |
| 9 | OFF | ON | ON | OFF | NORMAL | H | L |
| 10 | OFF | ON | ON | OFF | WELDED | H | L |
| 11 | OFF | OFF | OFF | ON | NORMAL | H | H |
| 12 | OFF | OFF | OFF | ON | WELDED | H | H |
| 13 | OFF | OFF | ON | OFF | NORMAL | H | H |
| 14 | OFF | OFF | ON | OFF | WELDED | H | H |

| E1 | E2 | SWITCHING ELEMENT 4; ON, 5; OFF | SWITCHING ELEMENT 4; OFF, 5; ON |
|---|---|---|---|
| H | H | NORMAL | NORMAL |
| L | H | THE RELAY IS WELDED AND THE SWITCHING ELEMENT 7 IS SHORT-CIRCUITED. | THE RELAY IS WELDED, THE SWITCHING ELEMENT 4 IS SHORT-CIRCUITED, THE ELEMENT 5 IS OPEN-CIRCUITED AND THE ELEMENT 7 IS SHORT-CIRCUITED. |
| H | L | THE RELAY IS WELDED, THE SWITCHING ELEMENT 4 IS OPEN-CIRCUITED, THE ELEMENT 5 IS SHORT-CIRCUITED AND THE ELEMENT 6 IS SHORT-CIRCUITED | THE RELAY IS WELDED AND THE SWITCHING ELEMENT 6 IS SHORT-CIRCUITED. |
| L | L | THE RELAY IS WELDED. | THE RELAY IS WELDED. |

PRIOR ART

ELECTRIC POWER STEERING SYSTEM

BACKGROUND OF THE INVENTION

1. Technical Field

The present invention relates to an electric power steering system for controlling steering of a vehicle and, more particularly, to a fail-safe.

2. Background Art

In electric power steering system for controlling steering of a vehicle, control is sometimes suspended by its fail-safe function when any trouble occurs. This control suspension secures steering performance of the vehicle by suspending turning operation of steering wheel with a motor and switching the operation to manual operation mode by the driver. As a specific example of the control suspension, an electric current flowing to the motor which outputs an auxiliary torque is interrupted not only by suspending a motor driving circuit but also by opening a relay for supplying a power in order to interrupt the power supply. However, there is a possibility that contact point of this relay is welded and does not open, and therefore it is necessary to inspect the function of the relay. Japanese Patent No. 2715473 proposes a method for detecting the relay welding.

Figure 8:
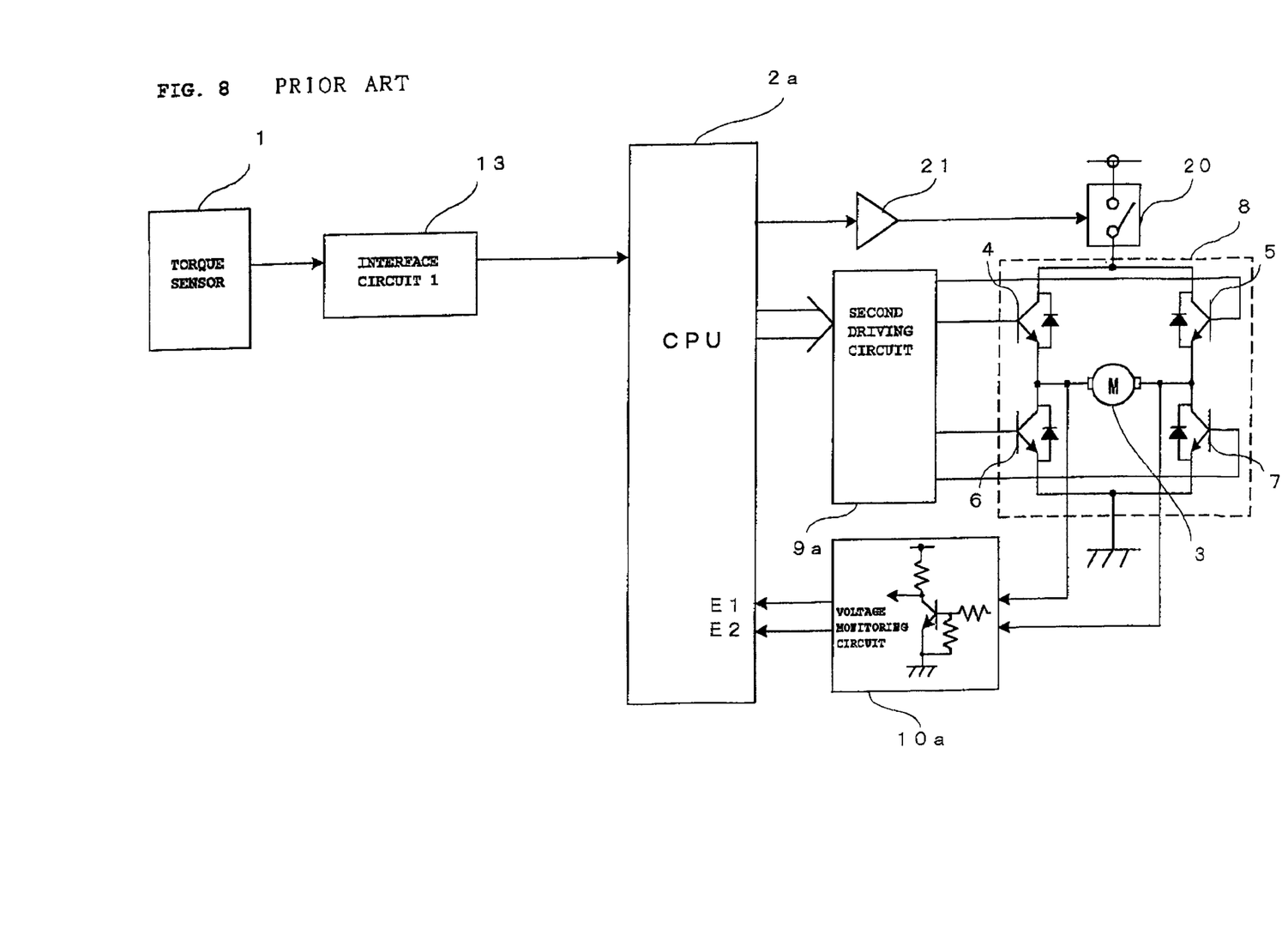
FIG. 8 is a block diagram of an electric power steering system according to a prior art.

Described below is such a problem of relay welding with reference to FIG. 8. In the drawing, reference numeral 1 is a torque sensor for detecting a steering torque. Numeral 2a is means for calculating controlled variable, which calculates an auxiliary torque on the basis of the torque information and outputs a control signal, and is a microcomputer (hereinafter referred to as CPU). Numeral 13 is an interface circuit 1 which transmits this-torque information to the CPU 2a. Numeral 3 is a motor which is arranged in the steering system and generates the auxiliary torque, and is driven by switching elements 4 to 7. Numeral 8 is a first driving circuit mainly composed of the switching elements 4 to 7. Numeral 9a is a second driving circuit for driving the switching elements 4 to 7 according to a control signal from the CPU 2a. Numeral 10a is a voltage monitoring circuit which detects voltages at two ends of the motor 3, and the outputs therefrom are inputted to the CPU 2a as E1 and E2. Numeral 20 is a relay which supplies a power to the motor 3 and the switching elements 4 to 7, and is driven by a switch driving circuit 21 depending on a signal from the CPU 2a.

Figure 9:
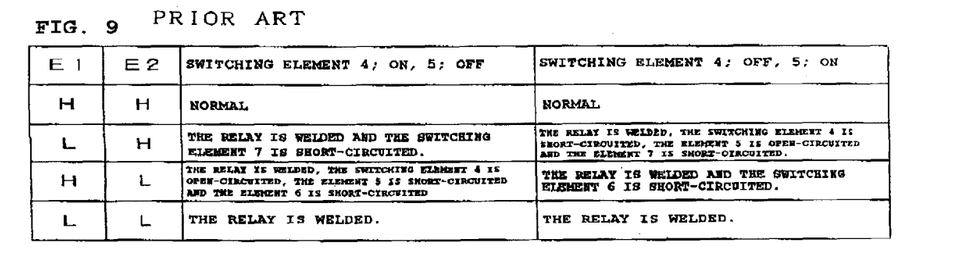
FIG. 9 is a table showing the relation between switching elements and voltage according to the prior art.

Described now is how to detect welding of the relay 20. First, contact point of the relay 20 is opened in advance by the switch driving circuit 21. The switching element 4 or 5 is driven, and the CPU 2a inputs the result from the voltage monitoring circuit 10a. In this case, the voltage monitoring circuit is an inverter circuit comprising a transistor element, and each driving mode thereof is shown in FIG. 9.

When the switching element 4 is turned on and the element 5 is turned off, both of the signals of E1 and E2 are high (hereinafter referred to as H) under normal condition. All other cases indicate an abnormal condition. In the same manner, when the switching element 4 is turned off and the element 5 is turned on, both of the signals of E1 and E2 are H under normal condition, and all other cases indicate an abnormal condition. FIG. 9 clearly shows that the contact point of the relay is welded except under normal condition. However, the driving circuit 9a, voltage monitoring circuit 10a, and others are under normal condition.

Figure 10:
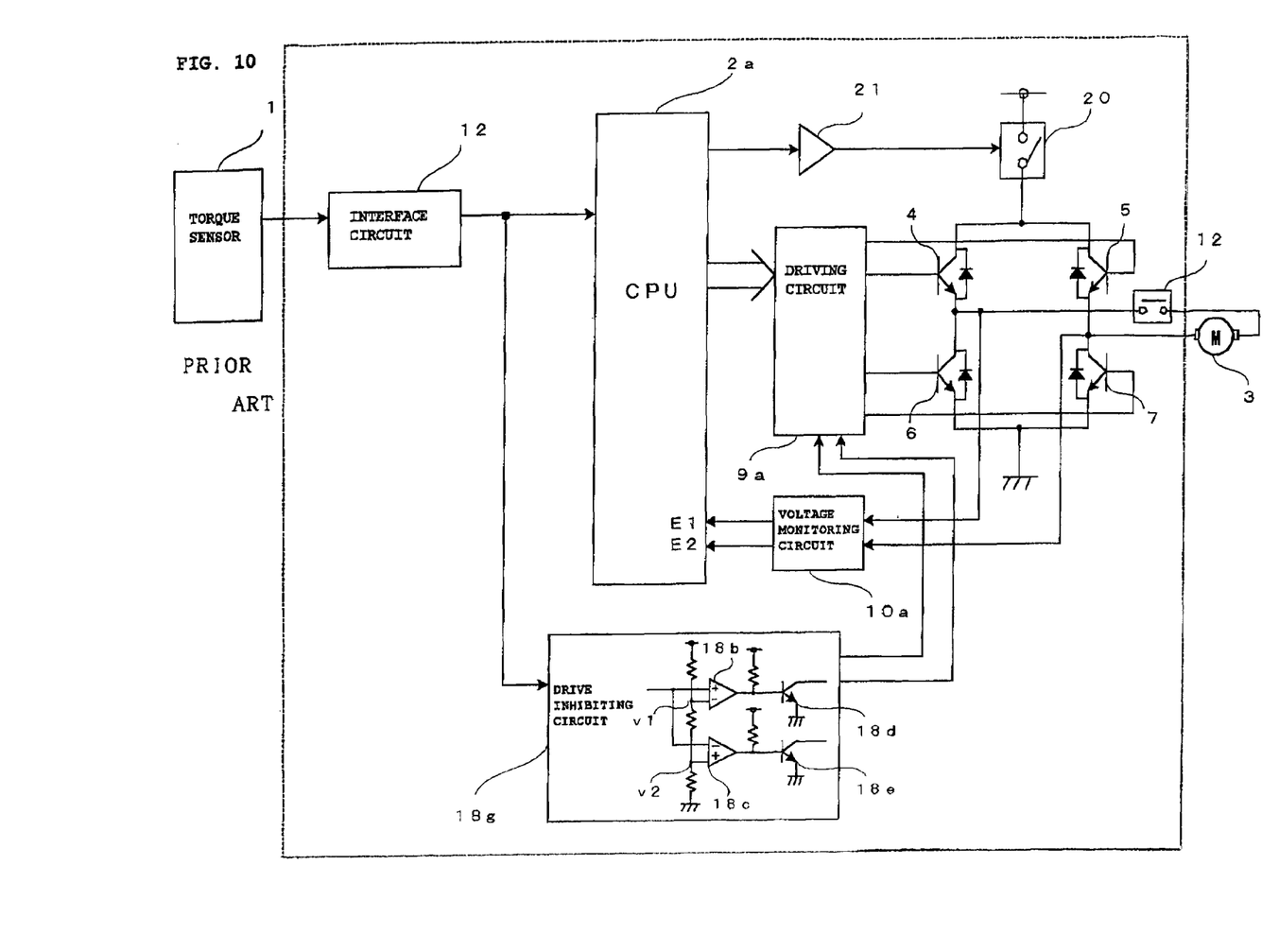
FIG. 10 is a block diagram of an electric power steering system according to the prior art.

On the other hand, Japanese Patent Publication (unexamined) No. 62-231871 proposes that a relay is interposed also between the driving circuit and the motor (hereinafter referred to as motor relay). FIG. 10 is a block diagram in which a motor relay 12 is connected in series to the motor 3. Diodes are inserted in parallel between the switching elements 4 to 7. Even if the relay 20 (hereinafter referred to as power supply relay) is opened, the motor is rotated when the driver turns the steering wheel, and a regenerative current flows by means of these diodes. Therefore, in case where one of the switching elements is short-circuited and broken, there arises a condition of different load in the turning direction of the steering wheel depending on the turning direction of the steering wheel or the motor, and this obstructs smooth turning of the steering wheel. To cope with this, the motor relay 12 is added.

It may be obvious to combine the foregoing two inventions, however, actual control unit (hereinafter referred to as ECU) is further provided with a fail-safe function, and this brings about a problem in that it is impossible to easily inspect the motor relay. For example, in consideration of any trouble in the CPU 2a, means for inhibiting drive of the motor (hereinafter referred to as motor drive inhibiting means) is required other than the CPU. Such motor drive inhibiting means has made it difficult to inspect the relay. In other words, it is certainly possible to inspect the motor relay so long as the motor drive inhibiting means is in a motor driving condition. But when the motor drive inhibiting means is in a motor drive inhibiting condition, the switching elements are not driven even if the motor relay is inspected and it is impossible to judge whether or not the motor relay is in malfunction.

Figure 11:
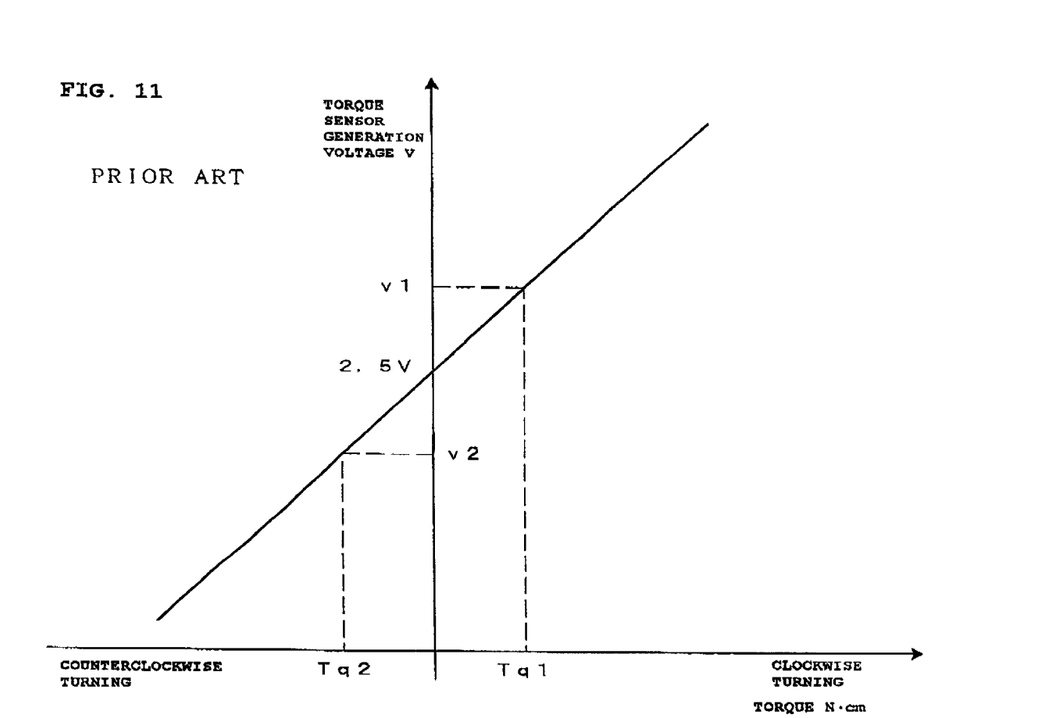
FIG. 11 is a graph showing the relation between produced torque of a torque sensor and generated voltage.

This problem is now described in more detail with reference to FIG. 10. Drive inhibition circuit 18g acts so that the driving circuit 9a may become inoperative in a case where the steering wheel is little turned, i.e., when torque is little produced. A switching element for left turning is suspended during a clockwise turning, while a switching element for right is suspended during a counterclockwise turning. FIG. 11 is a graph showing the relation between the torque and the output of the torque sensor. The switching element 4 or 7 for clockwise turning is suspended when the torque is smaller than Tq2, and the switching element 5 or 6 is suspended when the torque is larger than Tq1. Less torque is produced in a range from v2 to v1 in torque sensor output voltage. It is therefore unnecessary to drive the motor 3 in this range. Accordingly, the drive inhibition circuit 18g, which acts so that the driving circuit 9a may become inoperative, is added in addition to the CPU 2a. More specifically, the drive inhibition circuit 18g in FIG. 10 judges whether or not the torque sensor output voltage is within v1 and v2 through comparison using two comparators 18b, 18c.

When the torque sensor output is larger than v1, a transistor 18d is turned on and the switching element 5 or 6 is turned off. On the other hand, when the torque sensor output is smaller than v2, the circuit is connected so that the transistor 18e may be turned on and the switching element 4 or 7 may be turned off. When the drive inhibition circuit 18g is working, i.e., when the transistor 18d or 18e is turned on, the switching elements 4, 5 or 6, 7 still remain in the off condition even if the CPU 2a outputs a control signal. Therefore, it is impossible to inspect the motor relay 12 in this condition.

As described above, the conventional system has a problem in that the drive inhibition circuit obstructs inspection of the relay and the relay cannot be easily inspected.

SUMMARY OF THE INVENTION

The present invention was made to resolve the above-discussed problems and has an object of providing an electric power steering system in which the fail-safe function is improved making it possible to detect a trouble.

An electric power steering system according to the invention, which possesses torque detecting means for detecting a steering torque, controlled variable calculating means for calculating a controlled variable, by which a motor conducts steering of a vehicle, on the basis of the torque information from the torque detecting means, and driving means for driving the motor by switching elements upon receiving the controlled variable, comprises: drive restricting means for restricting drive which restricts at least a part of operation of the driving means on the basis of the torque information separately from the controlled variable calculating means; first switching means which is arranged between the motor and drive means for connection and disconnection; and voltage monitoring means for monitoring terminal voltage of the motor;

wherein the controlled variable calculating means operates at least a part of said driving means for driving and inspects function of the first switching means on the basis of voltage information from the voltage monitoring means in a case where it is judged that the drive restricting means is suspending its operation or that the function is partly restricted on the basis of magnitude and direction of the torque or condition of the drive restricting means.

As a result, the system has an advantage of precisely inspecting the function of the first switching means even if the system possesses the drive restricting means.

It is preferable that the controlled variable calculating means is connected with the drive restricting means and inspects the function of the first switching means in a case where the operation of the drive restricting means is suspended or partly restricted on the basis of information from the drive restricting means. As a result, the system has an advantage of easily inspecting the function of the switching means.

An electric power steering system according to the invention, which possesses torque detecting means for detecting a steering torque, controlled variable calculating means for calculating a controlled variable, by which a motor conducts steering of a vehicle, on the basis of torque information from the torque detecting means, and driving means for driving the motor by switching elements upon receiving the controlled variable, comprises: drive inhibiting means for inhibiting drive which inhibits at least a part of operation of the driving means on the basis of the torque information separately from the controlled variable calculating means; first switching means which is arranged between the motor and drive means for connection and disconnection; voltage monitoring means for monitoring terminal voltage of the motor; and invalidating means for temporarily invalidating operation of the drive inhibiting means;

wherein the controlled variable calculating means operates the driving means and inspects function of the first switching means on the basis of voltage information from the voltage monitoring means during the period when the invalidating means is suspending the operation of the drive inhibiting means.

As a result, the electric power steering system according to the invention has an advantage of precisely inspecting the function of the first switching means even if the system possesses the drive inhibiting means.

It is preferable that, in the electric power steering system according to the invention, the invalidating means invalidates the drive inhibiting means by controlling a power supply of the torque detecting means.

As a result, the electric power steering system according to the invention has an advantage of easily invalidating the drive inhibiting means at any time.

It is also preferable that, in the electric power steering system according to the invention, the invalidating means invalidates the drive inhibiting means by controlling a signal from the torque detecting means.

As a result, the electric power steering system according to the invention has an advantage of easily invalidating the drive inhibiting means at any time.

It is also preferable that, in the electric power steering system according to the invention, the invalidating means invalidates the output signal of the drive inhibiting means by controlling the drive inhibiting means.

As a result, the electric power steering system according to the invention has an advantage of easily invalidating the drive inhibiting means at any time.

It is also preferable that, in the electric power steering system according to the invention, the function of the first switching means is inspected by inspecting whether the first switching means is capable of being disconnected and/or connected based on the relation between the drive of the switching elements of the driving means and the voltage monitored by the voltage monitoring means.

As a result, the electric power steering system according to the invention has an advantage of easily inspecting the function of the switching means.

It is also preferable that, in the electric power steering system according to the invention, the system has second switching means for supplying or disconnecting a power to the motor, and the controlled variable calculating means inspects whether the second switching means is capable of being disconnected and/or connected.

As a result, the electric power steering system according to the invention has an advantage of easily inspecting the function of the second switching means.

It is also preferable that, in the electric power steering system according to the invention, the system has second switching means for supplying or disconnecting a power to the motor and pseudo power supply means for supplying a pseudo power supply which is connected in parallel to the second switching means, and in a case where the controlled variable calculating means inspects the function of the first switching means, a power source is supplied from the pseudo power supply means.

As a result, the electric power steering system according to the invention has an advantage of adding electric current restriction and preventing induction of a secondary trouble even in a case where a trouble occurs downstream the second switching means.

It is also preferable that, in the electric power steering system according to the invention, the system has alarming means for alarming the driver in a case where the function of the first switching means is judged abnormal.

As a result, the electric power steering system according to the invention has an advantage of alarming the driver of the trouble or failure.

DESCRIPTION OF THE PREFERRED EMBODIMENTS

EXAMPLE 1

Figure 1:
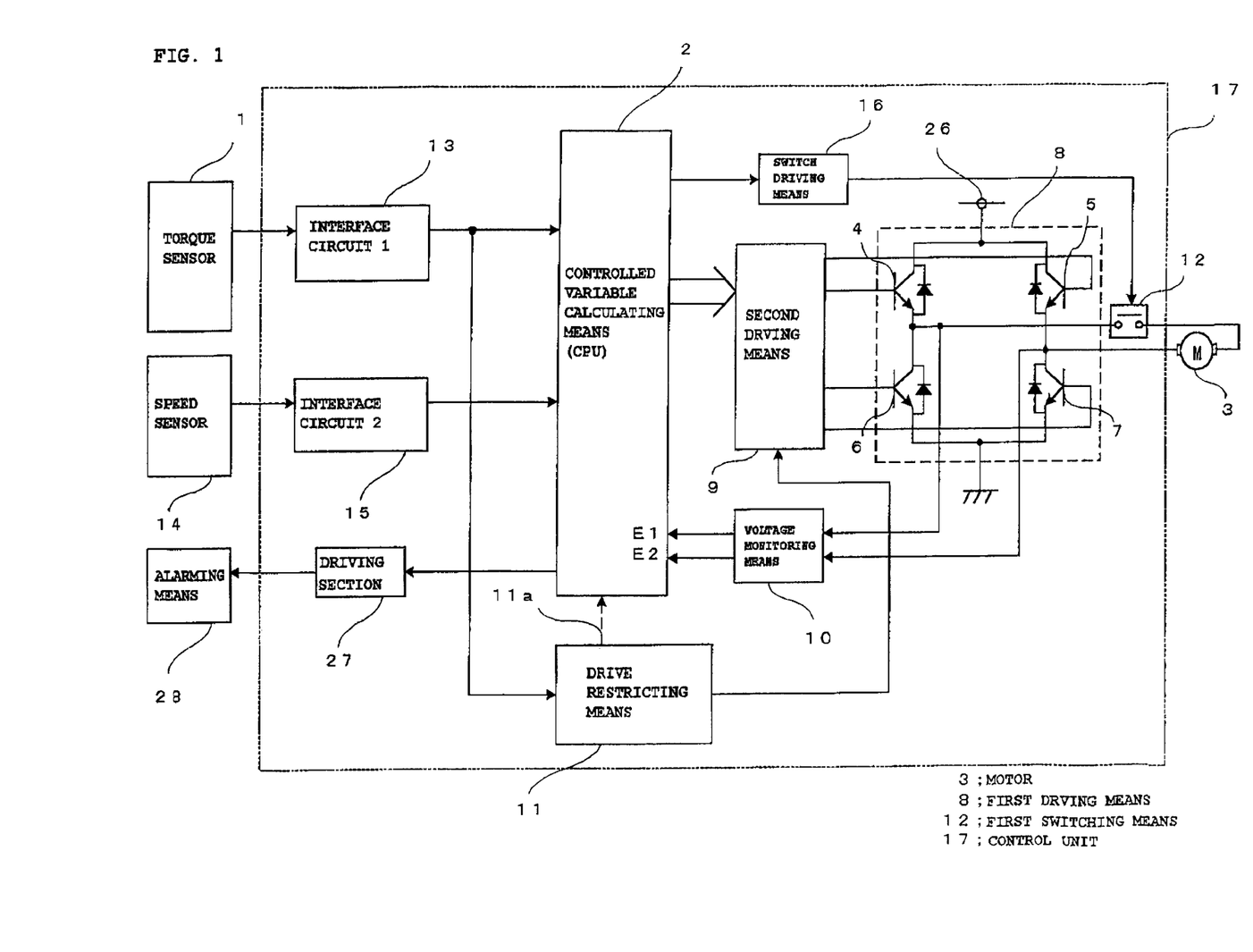
FIG. 1 is a block diagram of an electric power steering system according to Example 1 and Example 2 of the present invention.

Example 1 of the invention is hereinafter described with reference to the accompanying drawings. FIG. 1 is a block diagram showing an arrangement of an electric power steering system, which is composed of a motor 3, an ECU 17, a sensor 1, etc. Reference numeral 1 is steering torque detecting means and is a torque sensor. Numeral 13 is an interface circuit 1 for waveform shaping or filtering of the torque signal. Numeral 2 is controlled variable calculating means which calculates auxiliary torque on the basis of contents and direction of torque information, and is composed of a CPU. Numeral 3 is a motor which is arranged in the steering system and generates auxiliary torque. The steering wheel and tires are operated by rotation of the motor. Numerals 4 to 7 are switching elements of transistors or FETs forming what is called an H bridge circuit and forming first driving means 8. Numerals 4 and 7 and numerals 5 and 6 make pairs respectively and are driven in drive mode. Numeral 9 is second driving means which receives a control signal outputted from the CPU 2 and operates to control the first driving means. The first and second driving means 8, 9 form the driving means.

Numeral 10 is voltage monitoring means for monitoring terminal voltages of the motor 3, which detects voltages at both ends of the motor 3 and inputs them into the CPU2. Numeral 11 is drive inhibiting means which is capable of inhibiting operation of the motor driving means 8 or 9 on the basis of torque information separately from the CPU 2. Numeral 12 is first switching means which is connected in series with the motor 3, and is composed of a relay. In the motor relay 12, an electric current flows when a contact point is closed and the electric current is interrupted when the contact point is opened, and this operation is controlled by switch driving means 16. Numeral 14 is a speed sensor for detecting speed, and numeral 15 is an interface circuit 2 for waveform shaping of this speed information.

Described hereinafter is operation of the ECU 17 arranged as shown in FIG. 1. The CPU 2 receives a torque signal of the steering wheel operated by the driver, inputs the torque information, further receives a signal from the speed sensor 14, and calculates speed. A controlled variable for driving the motor 3 is calculated on the basis of the torque and speed so that torque corresponding to these input signals may be generated, and a control signal for driving the switching elements 4 to 7 is outputted. An electric current flows to the motor and the motor rotates by driving the switching elements, and this assists the driver in steering or automatically turning the steering wheel. Especially the second driving means 9 is a first stage driving circuit which drives the switching elements 4 to 7, and in a case where the switching elements are driven by PWM control, it is preferable to arrange a PWM circuit.

Under normal condition, the control signal of the CPU 2 is outputted to the switch driving means 16 for so that the motor relay 12 may be connected. When turning on the switching elements 4 and 7 in this situation, an electric current flows from a power source 26, and the motor 3 rotates in one direction (clockwise turning). On the other hand, when turning on the switching elements 5 and 6, the motor 3 rotates in the reverse direction (a counterclockwise turning). A diode is connected to each switching element 4 to 7 in a row or is incorporated in each switching element 4 to 7. This diode is what is called a flywheel diode, which absorbs counter electromotive force induced by a coil of the motor when the switching elements are switched from on to off.

In addition to the CPU 2, the drive restricting means 11 is incorporated in the ECU 17 so that the rotation of the motor 3 may be suspended even when the CPU 2 loses its normal judgement. This drive restricting means 11 is fundamentally equivalent to the drive inhibiting means 18g described referring to FIG. 10, and inhibits rotation in reverse direction corresponding to direction or contents of torque information. In a case where the torque signal is relatively small, the drive restricting means 11 acts to suspend all rotations. It is possible to arrange a hysteresis between a case where the absolute value of the produced torque becomes larger than the torque generation voltage value in FIG. 11 and a case where the absolute value of the produced torque becomes smaller than the torque generation voltage value. Output of the drive restricting means 11 acts on the first or second driving means 8, 9 and finally acts to turn off at least one of the switching elements 4 to 7.

Figure 2A:
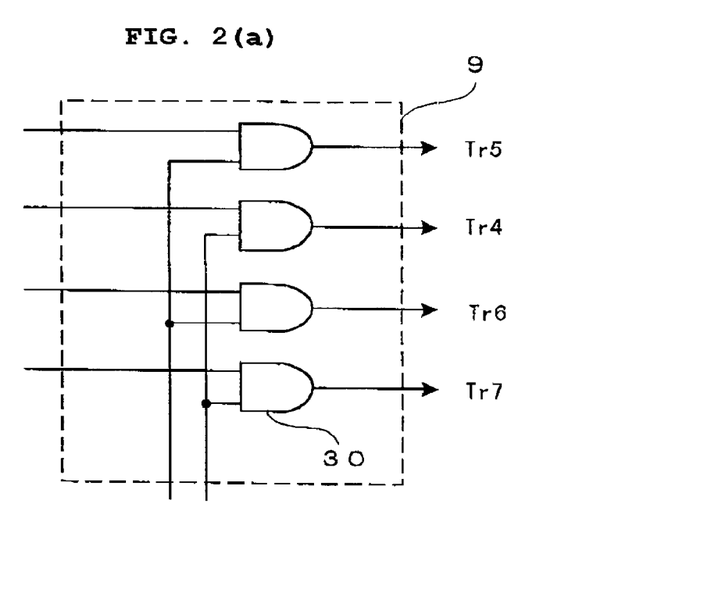
FIGS. 2(a) and (b) are respectively partial circuit diagrams in the driving means according to Example 1.
Figure 2B:
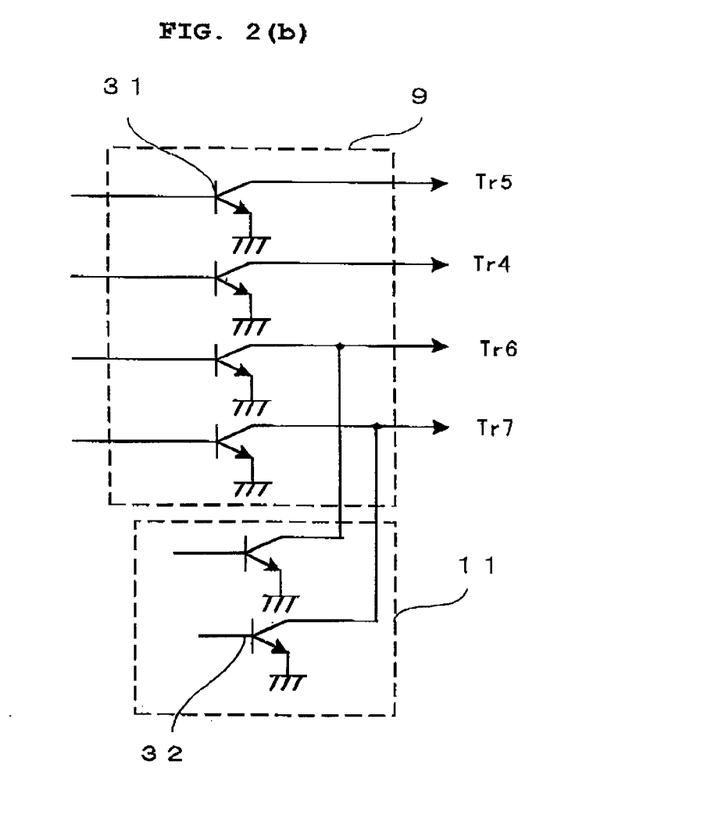

Described below with reference to FIG. 2 is how drive of the driving means 8 or 9 is inhibited. In FIG. 2(a), the second driving means 9 is composed of an AND circuit 30, which outputs AND of a signal from the drive restricting means 11 and a control signal of the CPU 2. Accordingly, when the drive restricting means 11 outputs an inhibition signal (LOW output), the switching elements 4 to 7 are turned off. In FIG. 2(b), the second driving means 9 is composed of a transistor 31, and a last stage output of the drive restricting means 11 is also composed of a transistor 32. When this transistor 32 is turned on, the switching element 6 or 7 of H bridge is turned off. As shown in FIG. 2, the drive restricting means 11 interrupts the electric current flowing into the motor by inhibiting a part of or all operation of the driving means 8 or 9 separately from the CPU 2.

Figure 3:
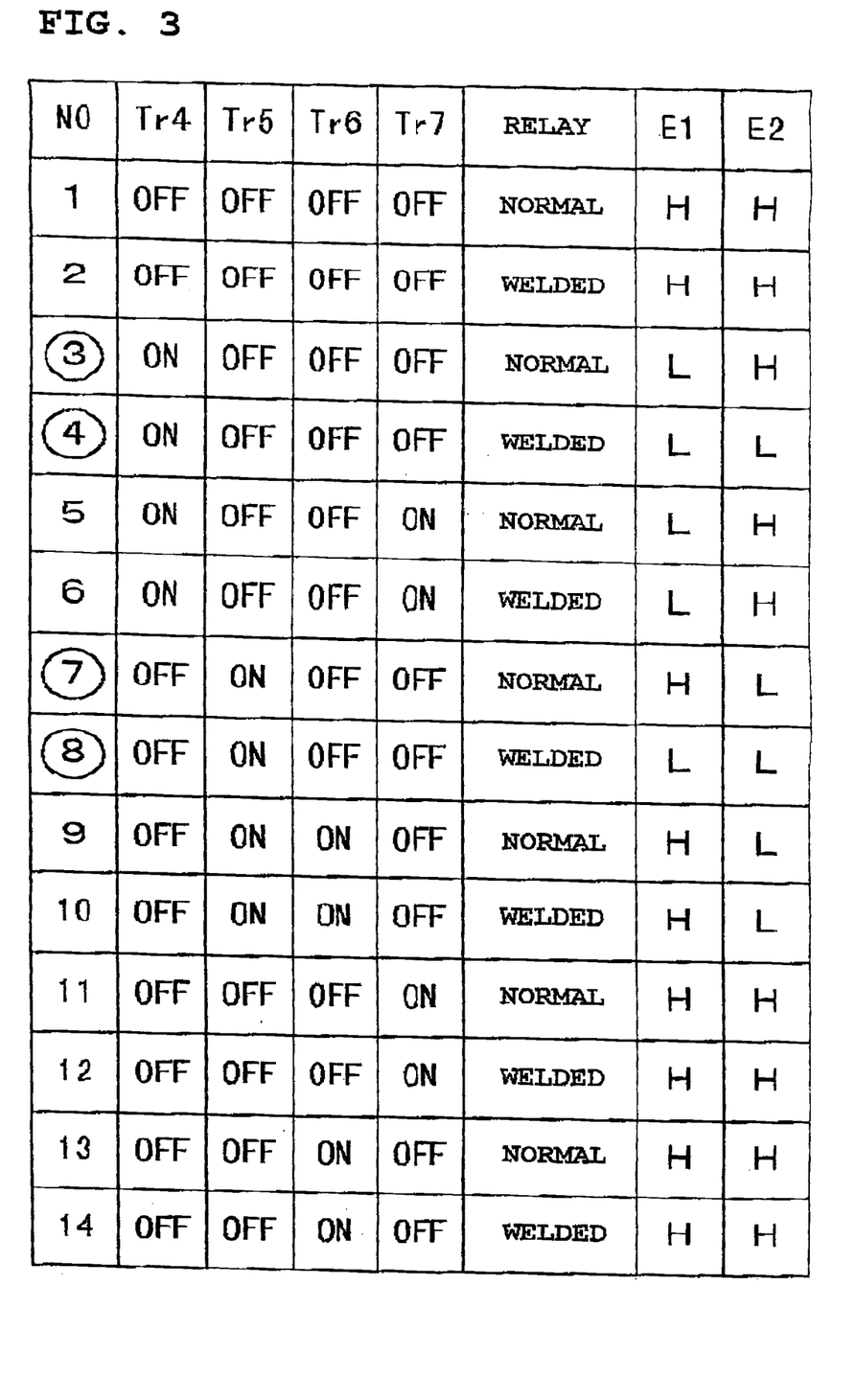
FIG. 3 is a table showing the relation between switching elements and voltage according to Example 1.

Described below is how the motor relay 12 is inspected. Fundamentally, the switching elements 4 to 7 are driven and the CPU 2 judges the voltages at both ends of the motor 3 on the basis of the signals E1, E2 from the voltage monitoring means 10. FIG. 3 shows all combinations of input and output. Combinations each marked with a circle are items of which inspection is especially required. In this connection, the voltage monitoring means 10 is composed of a circuit equivalent to that in FIG. 8. In other words, the voltage monitoring means 10 has a function of inverter circuit in which E1 or E2 becomes L when the motor terminal voltage is high and becomes H when the voltage is low. In the case of item No. 4, for example, in which only the switching element 4 is turned on while the rest being turned off, there is a possibility that contact point of the motor relay 3 is closed (welded) when the output of the means 11 for monitoring voltage is E1=L and E2=L. In the case of item No. 8 in which only the switching element 5 is turned on while E1=L and E2=L, it is judged from them that contact point of the motor relay 12 is closed. As described above, welding of the motor relay 12 is easily inspected from the drive combination of the switching elements described in FIG. 3. Other than the inspection of the motor relay 12, it is also possible to inspect the switching elements as described in this combination list. Furthermore, the voltage monitoring means 11 can perform the same function, even in the case of A/D (analog/digital) converter which is capable of directly reading the voltage without inverter function.

The motor relay can be inspected through the foregoing method as long as the drive restricting means 11 is not working. When the drive restricting means 11 is working, the CPU 2 can not be driven at all even if the switching elements 4 to 7 are driven. As a result, not only it is impossible to conduct the foregoing inspection but also it might cause a misjudgment. Therefore, inspection of the motor relay 12 is limited to a case where the drive restricting means 11 is not working. There are two methods for conducting the inspection, one is an inspection upon detecting a situation of not working and the other is an inspection after forcedly creating a situation of not working. First, described below is the method of detecting a situation in which the drive restricting means 11 is not working. In a case where the drive restricting means 11 acts so that only one or two of the switching elements may be turned off depending on the direction of the torque, that is, when the torque is larger than Tq1 in FIG. 11, the electronic circuit shown in FIG. 2 operates so that the switching element 5 or 6 for a counterclockwise turning may be turned off. Therefore, the CPU 2 judges on the basis of torque information so that the switching elements 4, 7 are driven to inspect welding of the motor relay 12.

If there is a possibility of welding, the driver is warned visually and aurally. Alarming means 28 such as lamp or buzzer alarms the driver. Numeral 27 is a driving section for driving the alarming means 28. When the power steering is not controlled, it is possible to suspend the power steering function itself, and the driver is alarmed to secure his safety. In addition, when only the motor relay 12 is abnormal, the driver is alarmed, but it is not necessary to suspend the control. This is because there remain still means for suspending the control by the switching elements or drive restricting means when a further trouble occurs.

As described above, the motor relay 12 is inspected by judging the situation of the drive restricting means 11 by the CPU 2 and selecting the switching elements to be driven corresponding to the situation.

Moreover, not only the motor relay 12 but also the switching elements are checked on any trouble utilizing the combinations shown in FIG. 3, and it is possible to detect abnormal condition of more systems.

EXAMPLE 2

Example 2 is now described with reference to FIG. 1. There is another method for the CPU 2 to judge the situation of the drive restricting means 11, and this method is achieved by simply transmitting a signal from the drive restricting means 11 to the CPU. A signal from the torque sensor 1 is inputted to the drive restricting means 11, and the drive restricting means 11 always seizes contents and direction of the signal. More specifically, a signal of a situation in which driving is not restricted for a while is sent from the drive restricting means 11 to the CPU 2 utilizing a broken line 11a in FIG. 1. When inputted this signal, the CPU 2 comes to drive a part of the switching elements in order to inspect the motor relay 3.

As described above, the CPU 2 is inspected more easily by informing a time during which it is possible to inspect the motor relay from the drive inhibiting means itself. Further, addition of the function is achieved just by adding a piece of wiring. The drive restricting means temporarily suspends its function for the purpose of inspecting the motor relay. This enables the CPU 2 to inspect the motor relay before the system starts its operation, eventually resulting in improvement in safety.

EXAMPLE 3

Figure 4:
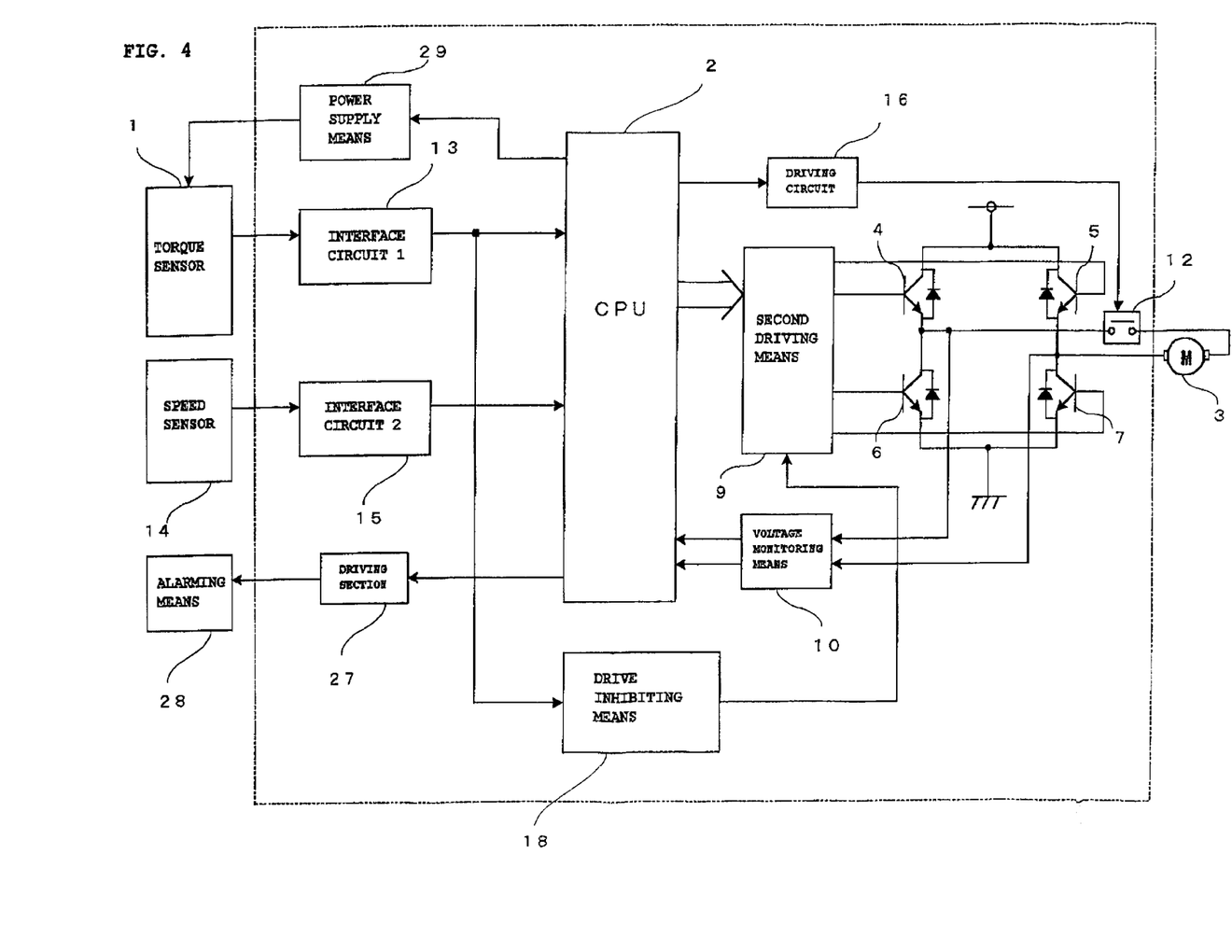
FIG. 4 is a block diagram of an electric power steering system according to Example 3.

Example 3 is now described with reference to FIG. 4. FIG. 1 and FIG. 4 are different only in the aspect of drive inhibiting means 18 and power supply means 29 for supplying a power of the torque sensor. The same reference numerals are designated to the same or like parts. The drive inhibiting means 18 forcedly suspends drive of the driving means 8, 9. On the other hand, a power source for the torque sensor is supplied from the power supply means 29. The CPU 2 outputs a control signal for suspending the power supply means when a predetermined situation or a predetermined time comes. Then, the power supply stops, and the generated voltage drops to 0V because the torque sensor does not have a power source. Next, the drive inhibiting means 18 detects that the torque generation voltage is 0V and, for example, off operation of the switching elements is suspended or only a clockwise turning is suspended. Therefore, after the CPU 2 interrupts the torque sensor power source, the drive suspending means 18 suspends the off state of the switching elements. In anticipation of the delay, the CPU 2 drives the switching elements for the purpose of inspecting the motor relay.

As described above, since the power steering system according to this example is provided with the power supply means 29 as invalidating means for invalidating the drive inhibiting means 18, operation of the drive inhibiting means can be forcedly suspended at any timing for any period by interrupting the sensor power supply depending on the CPU 2. It becomes also possible to inspect the motor relay at any time for the convenience of the CPU 2. In the above mentioned case, the power source is interrupted by the means 29 for supplying a power source, and it is also preferable that the torque sensor output becomes a level for operating the drive inhibiting means 18 by changing the power supply voltage to a predetermined value.

EXAMPLE 4

Figure 5:
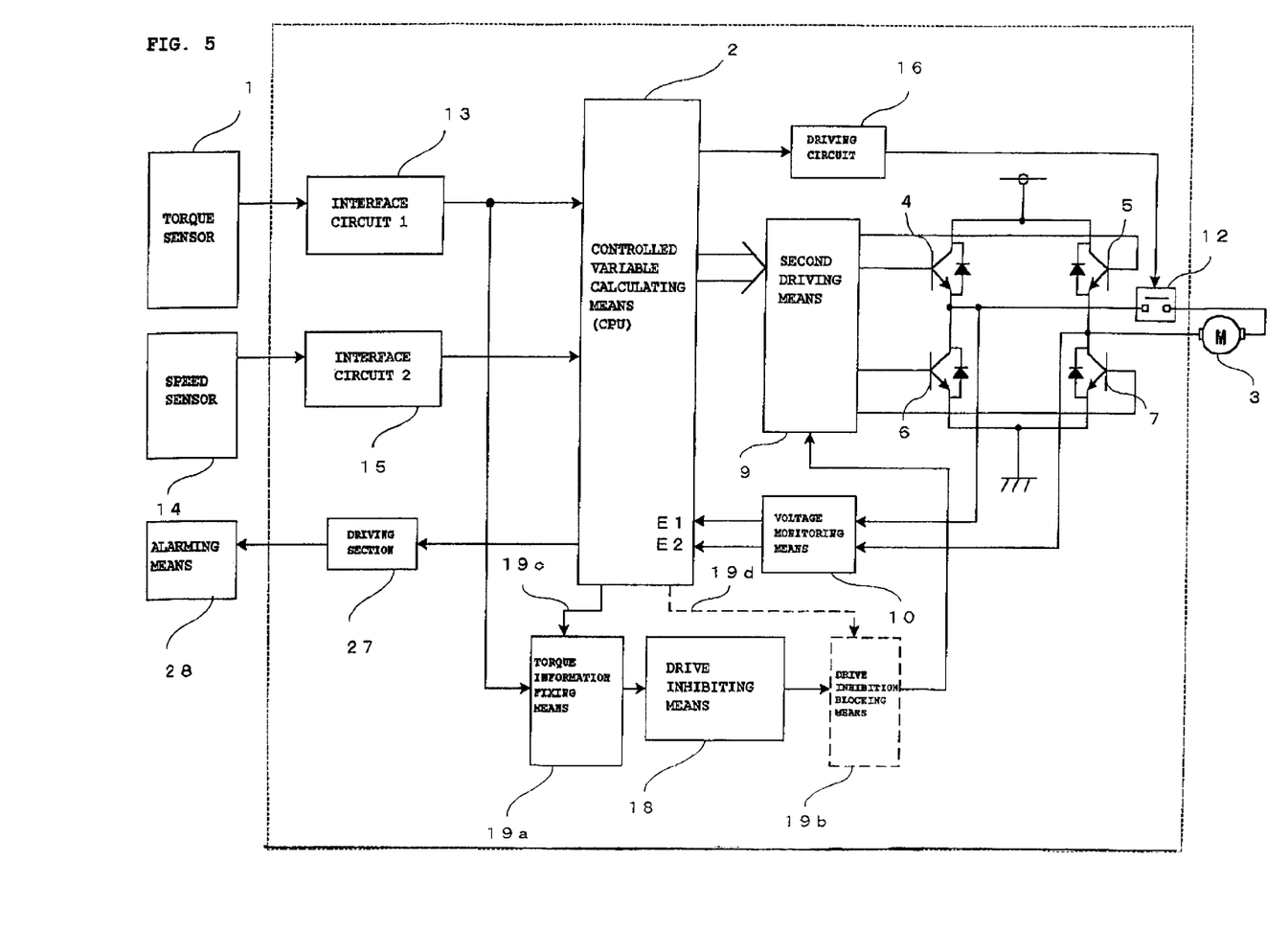
FIG. 5 is a block diagram of an electric power steering system according to Example 4 and Example 5.

Example 4 is now described with reference to FIG. 5. FIG. 5 and FIG. 4 are different only in the aspect that the invalidating means is replaced by means 19a or 19b existing in front of or behind the drive inhibiting means 18. The same reference numerals are designated to the same or like parts. First, the means 19a is described below.

This means 19a also forcedly suspends the drive inhibiting means 18. More specifically, numeral 19a is torque information fixing means which fixes a signal of the torque sensor at a predetermined value. For example, when the torque signal is outputted in the range from 0V to 5V, the signal is fixed at 0V or 5V. When the torque signal comes to 1V or 5V, the drive inhibiting means 18 naturally inhibits turning only in one direction, and does not inhibit turning in other direction. In case of a torque signal fixed at 5V, clockwise turning is permitted and counterclockwise turning is inhibited as is understood from the graph in FIG. 11, and therefore the switching elements 4, 7 are authorized while the switching elements 5, 6 are inhibited. In this case, the CPU 2 inspects the motor relay 12 by driving the switching element 4 or 7. Furthermore, by inputting a control signal to be fixed (19c) by the CPU 2, the torque information fixing means 19a easily seizes the timing and period for inspecting the motor relay.

The method for fixing the torque signal at 0V or 5V, i.e. fixing the torque output voltage, is described above as a method for fixing the torque signal. It is also preferable to use another method according to the type of the torque sensor. For example, in a case where the output signal is generated by a drive pulse, it is preferable to employ a method in which output value is fixed by modulating a drive pulse signal (for example, in case of driving at duty 50%, duty is changed to 20% for driving). The motor relay can be easily inspected by temporarily making the drive inhibiting means 18 inoperative through the method for fixing the torque output value.

EXAMPLE 5

Described below is Example 5 with reference to FIG. 5. The drive inhibition blocking means 19b for blocking drive inhibition is used as another method for forcedly suspending the drive inhibiting means 18. This drive inhibition blocking means 19b operates to temporarily interrupt transmission of a drive inhibition signal to the driving means 9, and interrupts the signal or converts the signal level (which is changed from L to H or H to L). The drive inhibition blocking means 19b is driven by the CPU 2, thus the motor relay is inspected at any timing for any period.

However, in Example 5 and Example 6, there is a possibility that the drive inhibiting means 18 becomes inoperative at all times due to a trouble of the CPU 2. Therefore, it is desired to add a timer function to the signal of the CPU 2 so that the drive inhibiting means 18 may not become inoperative at all times even when the CPU 2 is broken.

EXAMPLE 6

Figure 6:
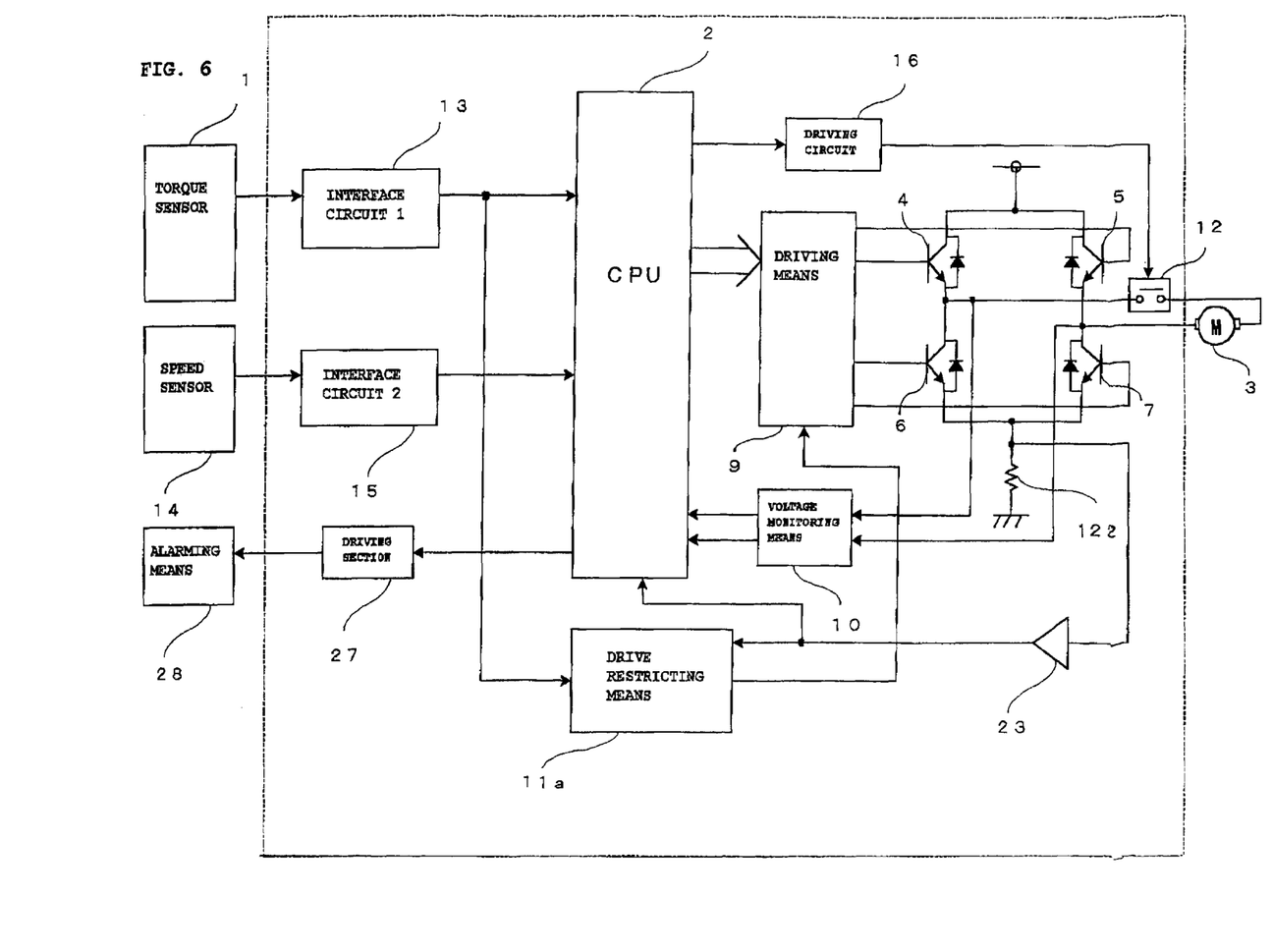
FIG. 6 is a block diagram of an electric power steering system according to Example 6.

Example 6 is now described with reference to FIG. 6. FIG. 6 and FIG. 1 are different mainly in the aspect of an electric current detecting resistor 122 for detecting an electric current, electric current detecting means 23, and drive restricting means 11a. The same reference numerals are designated to the same or like parts. The resistor 122 and the means 23 are provided for detecting an electric current flowing in the motor 3 through a voltage drop of the resistor. On the other hand, the drive restricting means 11a is arranged to flow an electric current within a limited level instead of inhibiting the driving means so long as a torque signal exists between, for example, Tq2 and Tr1 in FIG. 11. A motor electric current used in normal power steering is tens of amperes, and therefore the electric current limitation in this case is set within a range in which several amperes of electric current is allowed to flow. Therefore, even if an electric current flows, the electric current is not enough to turn the steering wheel by itself or exert a negative influence on assisting force. In other words, any electric current is sufficient so long as the electric current is enough to inspect the motor relay 12, switching elements 4 to 7, and so on.

In a case where the CPU 2 outputs the electric current flowing to the motor 3 as a controlled variable on the basis of the torque and speed, the electric current detecting means (122, 23) are incorporated in the ECU. If the ECU is a unit of electric current feedback control type, it is not necessary to add these means for detecting an electric current. In this case, just addition of such function to the drive restricting means is sufficient.

As described above, in the case where the drive restricting means 11a provided with the inhibition electric current function is utilized, the motor relay 12 is inspected anytime so long as the power steering is not operated regardless of the situation of the signal generated from the torque sensor. In the foregoing Example 1 to Example 5, it is necessary to regulate the drive of the switching elements so that the electric current flowing to the motor 3 may remain small in the inspection of the motor relay 12 considering the possibility of motor relay welding. However, in the range (Tq2 to Tq1) of small torque generation, the electric current flowing to the motor 3 is restricted even when the motor relay 12 is welded, and therefore there is no likelihood that the steering might turn by itself, and the inspection can be conducted easily.

EXAMPLE 7

Figure 7:
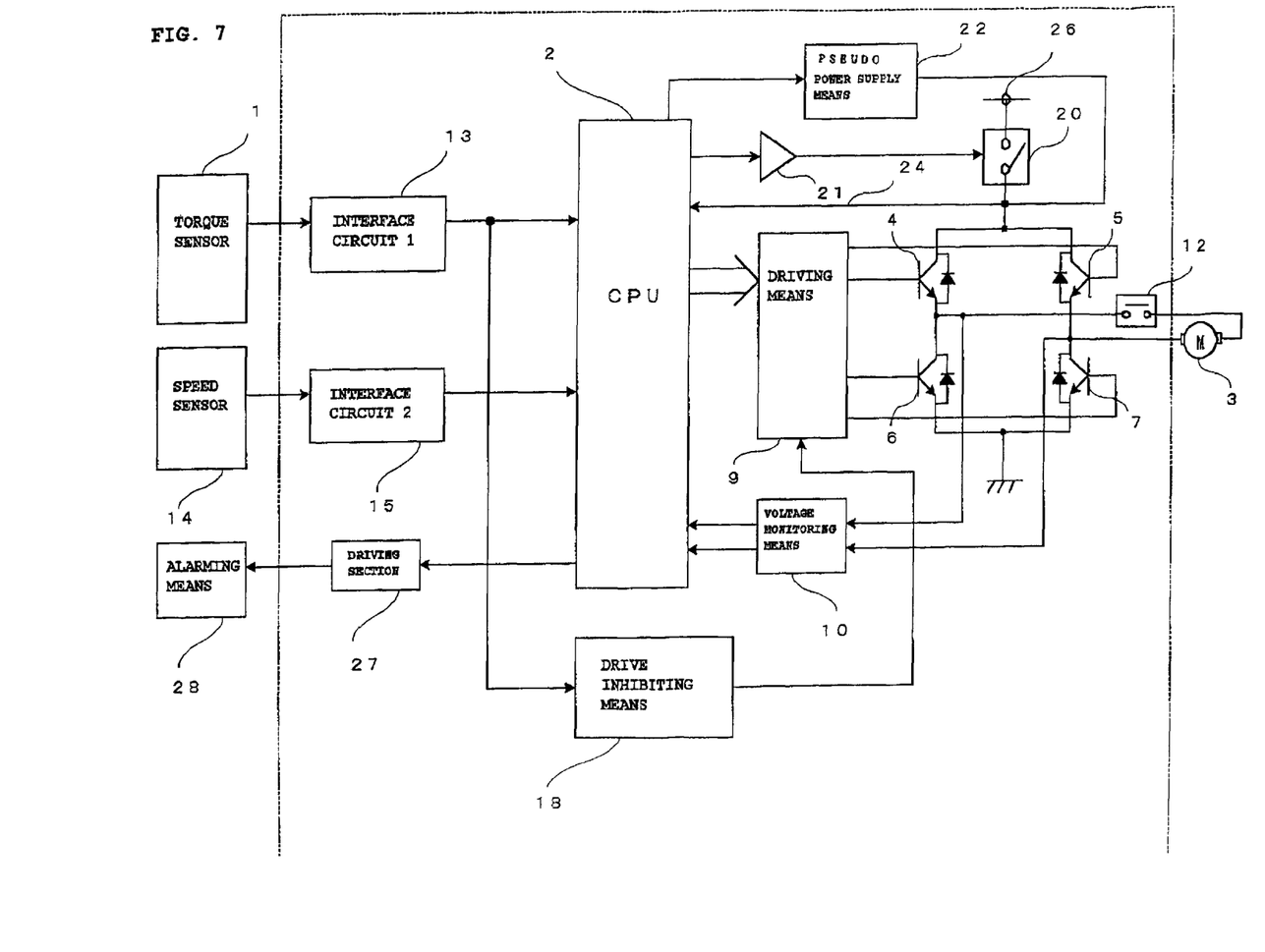
FIG. 7 is a block diagram of an electric power steering system according to Example 7.

Example 7 is now described with reference to FIG. 7. There is a difference between FIG. 7 and FIG. 4 in the aspect that second switching means (power supply relay) 20 is arranged in series between the driving means 8 and the power source 26. Further, a switch driving circuit 21 drives this power supply relay 20, and pseudo power supply means 22 for supplying a pseudo power is arranged in parallel to the power supply relay 20. The same numerals are designated to the same or like parts in the drawings. The power supply relay 20 is provided mainly for the purpose of interrupting power supply in case of a trouble such as short-circuit or grounding of electric element downstream the power supply relay 20. In other words, when the switching elements 4 and 6 are short-circuited or grounded, the contact point is opened in order to interrupt the power source. Whether or not any trouble occurs in electric element downstream the power source relay 20 cannot be detected unless a power is supplied. But there is a possibility of inducing another trouble when supplying an excessive power in a case where there is a possibility of trouble. Therefore, the power supply relay 20 is closed upon supplying a power source restricted by the pseudo power supply means 22 and inspecting the motor relay 12, the switching elements 4 to 7, and so on.

For inspecting the motor relay 12, first the power source relay 20 is opened by the switch driving circuit 21. Then, the pseudo power supply means 22 is driven, and a power source having a restricted electric current is supplied to the downstream. This pseudo power supply means 22 may be, for example, a precharge circuit or other circuit provided with a resistor for pulling up the power supply as the simplest circuit. It is not always necessary that the electric current supplied from the electric current supply source is a large permissible electric current as is the power source relay 20. But a permissible electric current enough to detect disconnection, short-circuit, and so on occurred in the electric element or the motor 3 is just required. The motor relay 12 or the switching elements 4 to 7 are inspected using this pseudo power supply, and if the result of inspection renders normal, the power supply relay 20 is closed. Inspection of the power supply relay 20 is also conducted by driving the switching elements 4 to 7 and the voltage monitoring means 10, and it is also preferable to inspect by directly detecting the voltage at a line 24.

As described above, it becomes possible to reduce the possibility of inducing a secondary trouble by adding the electric current restriction in the case where any trouble occurs downstream the pseudo power supply means.

What is claimed is:

1. An electric power steering system, which possesses torque detecting means for detecting a steering torque, controlled variable calculating means for calculating a controlled variable, by which a motor conducts steering of a vehicle, on the basis of the torque information from said torque detecting means, and driving means for driving said motor by switching elements upon receiving the controlled variable, comprising:

drive restricting means for restricting drive which restricts at least a part of an operation of said driving means on the basis of the torque information separately from said controlled variable calculating means;

first switching means arranged between said motor and driving means for connection and disconnection; and voltage monitoring means for monitoring a terminal voltage of said motor;

wherein said controlled variable calculating means operates at least a part of said driving means and inspects a condition of said first switching means on the basis of voltage information from the voltage monitoring means when an operation of said drive restricting means is suspended or partly restricted in response to a magnitude and a direction of the torque, or on the basis of a signal (11a) directly from said drive restricting means.

2. The electric power steering system according to claim 1, wherein the controlled variable calculating means is connected with the drive restricting means and inspects the condition of the first switching means when the operation of the drive restricting means is suspended or partly restricted on the basis of information from said drive restricting means.

3. The electric power steering system according to claim 1, wherein the condition of the first switching means is inspected by inspecting whether the first switching means is capable of being disconnected and connected based on a relation between the drive of the switching elements of the driving means and the voltage monitored by the voltage monitoring means.

4. The electric power steering system according to claim 1, wherein the system has second switching means for supplying or disconnecting a power to the motor, and the controlled variable calculating means inspects whether the second switching means is capable of being disconnected and connected.

5. The electric power steering system according to claim 4, wherein the system has second switching means for supplying or disconnecting a power to the motor and pseudo power supply means for supplying a pseudo power supply which is connected in parallel to the second switching means, and in a case where the controlled variable calculating means inspects the condition of the first switching means, a power source is supplied from said pseudo power supply means.

6. The electric power steering system according to claim 1, wherein the system has alarming means for signaling the driver in a case where the condition of the first switching means is judged abnormal.

7. An electric power steering system, which possesses torque detecting means for detecting a steering torque, controlled variable calculating means for calculating a controlled variable, by which a motor conducts steering of a vehicle, on the basis of the torque information from the torque detecting means, and driving means for driving said motor by switching elements upon receiving the controlled variable, comprising:

drive inhibiting means for inhibiting drive which inhibits at least a part of an operation of said driving means on the basis of said torque information separately from said controlled variable calculating means;

first switching means arranged between said motor and driving means for connection and disconnection;

voltage monitoring means for monitoring a terminal voltage of said motor; and invalidating means for temporarily invalidating the operation of said drive inhibiting means;

wherein said controlled variable calculating means operates said driving means and inspects a condition of the first switching means on the basis of voltage information from said voltage monitoring means during a period when the invalidating means is suspending the operation of the drive inhibiting means.

8. The electric power steering system according to claim 7, wherein the invalidating means invalidates the drive inhibiting means by controlling a power supply of the torque detecting means.

9. The electric power steering system according to claim 7, wherein the invalidating means invalidates the drive inhibiting means by controlling a signal from the torque detecting means.

10. The electric power steering system according to claim 7, wherein the invalidating means invalidates the output signal of the drive inhibiting means by controlling the drive inhibiting means.

* * * * *